(12) United States Patent
Toncelli

(10) Patent No.: US 6,205,727 B1
(45) Date of Patent: Mar. 27, 2001

(54) PROCESS FOR THE PRODUCTION OF REINFORCED SLABS OF STONE MATERIALS AND REINFORCED SLABS OF STONE MATERIAL

(76) Inventor: Marcello Toncelli, Via Papa Giovanni XXIII, 36061 Bassano del Grappa (Vicenza) (IT)

( * ) Notice: Subject to any disclaimer, the term of this patent is extended or adjusted under 35 U.S.C. 154(b) by 0 days.

(21) Appl. No.: 09/282,492

(22) Filed: Mar. 31, 1999

Related U.S. Application Data

(63) Continuation of application No. 08/789,627, filed on Jan. 27, 1997.

(30) Foreign Application Priority Data

Jan. 29, 1996 (IT) .............................................. TV96A0008

(51) Int. Cl.[7] ...................................................... E04C 2/28
(52) U.S. Cl. ................................... 52/309.15; 52/309.17; 52/612; 52/DIG. 7
(58) Field of Search ................................. 52/612, 309.15, 52/309.17, DIG. 7

(56) References Cited

U.S. PATENT DOCUMENTS

| 2,979,780 | * | 4/1961 | Gittins ............................... 52/DIG. 7 |
| 3,145,502 | * | 8/1964 | Rubenstein ......................... 52/309.15 |
| 4,911,138 | * | 3/1990 | Leis ..................................... 125/16.01 |
| 5,649,398 | * | 7/1997 | Isley, Jr. et al. ................... 52/309.13 |

FOREIGN PATENT DOCUMENTS 51-67636 * 6/1976 (JP) .................................. 52/309.15

* cited by examiner

*Primary Examiner*—Michael Safavi
(74) *Attorney, Agent, or Firm*—Reed Smith LLP

(57) ABSTRACT

The application of a reinforcing layer to the visible face of slabs of stone material. For slabs of marble and granite, especially thin slabs, the reinforcing layer is constituted by non-twisted glass threads, preferably in the form of a mat, and by a transparent resin resistant to the action of atmospheric and chemical agents. A reinforced slab is obtained which has a small thickness and in which the resistance to negative flexing is greatly increased, along a front face concomitantly with the resistance to positive flexing along the rear, or invisible, face of the slab when the rear face is also reinforced.

21 Claims, 1 Drawing Sheet

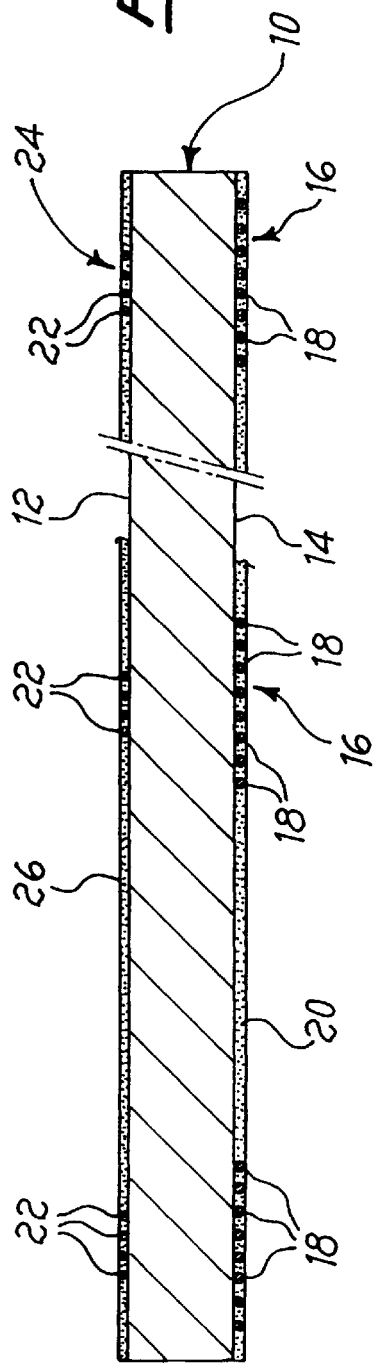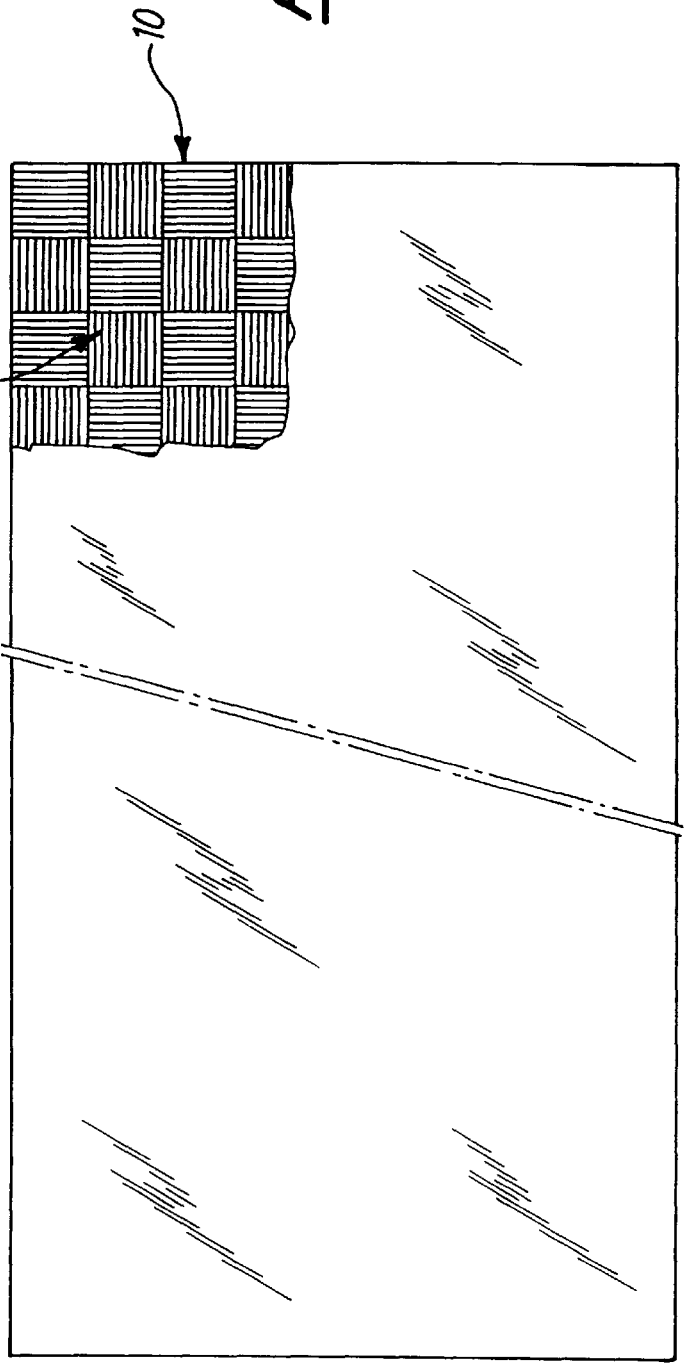

PROCESS FOR THE PRODUCTION OF REINFORCED SLABS OF STONE MATERIALS AND REINFORCED SLABS OF STONE MATERIAL

This is a cont of Ser. No. 08/789,627 filed Jan. 27, 1997.

BACKGROUND OF THE INVENTION

1. Field of the Invention

The present invention relates to a process for the production of reinforced slabs of stone material and also to the reinforced slabs of stone material so obtained.

More specifically, the present invention relates to a process for the production of slabs of stone material which have a small thickness and which exhibit a high level of resistance to both positive and negative flexing. These slabs are usually used as coverings for masonry structures, for example for pavings, for facing walls of buildings and, more generally, for applications in which the mechanical characteristics must be accompanied by special aesthetic effects. It is well known that, in the case of natural stone materials in the form of slabs, the main objective has always been, and still is, to produce slabs that are as thin as possible (for obvious reasons) without the mechanical properties being diminished to an unacceptable extent. With regard to thin slabs, a problem of not inconsiderable importance from the point of view of use is that of the manipulation of the slabs which have to be handled with great care to avoid breakages or cracks. Therefore, both during transport and in the course of their manipulation, for example during the moving operations which precede final installation, it is necessary to avoid any situation in which the slab is supported in a cantilevered manner, because any oscillation, however slight, of the free edge of the slab will inevitably lead to breakage.

2. Description of the Prior Art

European Patent Application No. 95201590.7, filed Jun. 15, 1995 and U.S. patent application Ser. No. 08/513,687, filed Aug. 11, 1995, now U.S. Pat. No. 5,670,007 in the name of Marcello Toncelli, the inventor of the subject matter of this application, describes a process for the production of thin slabs of stone material, such as marble and granite, which are reinforced at their rear face, or in other words the face that is not visible, which process basically consists in applying to the above-mentioned rear, or invisible, face of the slab a layer of hardenable resin, for example an epoxy resin, while incorporating in the resin layer a reinforcing material comprising non-twisted linear elements of glass threads, preferably in the form of a mat, and maintaining a specific percentage ratio by weight between the resin and the mat of glass threads. According to one variant, it is possible to form, in the rear face of the slab, cavities or grooves which accommodate additional linear reinforcing elements, preferably in the form of glass fibre strands, which are thus also embedded in the resin layer. U.S. patent application Ser. No. 08/513,687 corresponds to the above-mentioned European Patent Application No. 95201590.7 filed Jun. 15, 1995 in the. European Patent Office.

My earlier invention is concerned with a process for producing reinforced slabs of products made of stone material, having a reinforcement which includes a hardened resin combined with a rear face of the slab, and includes the provision of a slab stone material having a rear substantially smooth face free of grooves or recess, and in which non-twisted linear reinforcing elements are provided, and the non-twisted linear reinforcing elements are coated with a coating of a resin to form a reinforcement having a percentage ratio by weight of resin to the non-twisted linear reinforcing elements of at most 50:50, and a reinforcing layer is inserted between the coated non-twisted reinforcing elements and the rear face of the slab of stone material, and the resin is hardened.

Further features of my earlier invention are that the glass strands are in the form of a matting, the percentage weight ratio of the resin to the glass-strand matting is 33:66. In one embodiment, the linear reinforcing elements are made of metal, such as steel, and the linear reinforcing elements are housed in grooves or recesses formed on the rear face of the slab. Other features of my earlier invention with respect to the non-visible face of the slab of stone material are incorporated herein by reference.

With respect to the hardening of the resin, this is performed by either adding a catalyst to the resin, and/or the application of heat to the resin, or a combination of the addition of a catalyst and heat. A further feature of my earlier invention includes the application of two mats of non twisted glass strands impregnated with 33% by weight of an epoxy resin, to provide for a linear expansion coefficient of the mat and resin combination between 15 and $30 \times 10^{-6}$ per °C.

For further details on the method of implementing this process, the technical problem which this process solves and the properties of the resulting reinforced slabs, reference should be made to the text of the above-mentioned U.S. patent application which is incorporated herein by reference.

In particular, it is noteworthy that the flexural resistance of the slabs of stone material thus reinforced is greatly increased. For example, in the case of a granite slab from 10 to 12 mm thick, of which the flexural resistance is normally of the order of 150 $kg/cm^2$ by producing the reinforcement using two mats of glass threads and epoxy resin, it is found that the resulting composite slab, always for a total thickness of 10 mm, exhibits a flexural resistance of approximately 1350 $kg/cm^2$ In the case of facings for the external walls of buildings, it is, however, necessary also to bear in mind another resistance problem which is associated specifically with the action of atmospheric agents and, in particular, winds.

The flexural resistance is increased by the process disclosed in the above-mentioned U.S. patent application in respect of the reinforced face, while, for the face which is in view, this resistance remains at the usual values of from 120 to 180 $kg/cm^2$, depending upon whether the material concerned is marble, granite or another natural stone material.

When the building is subjected to winds of substantial force and speed, a partial vacuum, which can also cause the breakage of some of the slabs, with the obvious disadvantages, acts on the slabs covering the face of the building that is not directly subjected to the wind current, especially in the region of the vertical edges of the building.

On the other hand, no means have hitherto been known for increasing the flexural resistance of these slabs in respect of the face that is to form the visible face, for which there are absolutely essential requirements of a formal and aesthetic nature.

Therefore, the only solution for facing buildings situated in regions subjected to strong winds has hitherto been to adopt slabs of stone material of substantial thickness in order to compensate for the lesser flexural resistance.

SUMMARY OF THE INVENTION

The principal aim of the present invention is therefore to produce slabs of stone material which (a) have a small thickness;

(b) are reinforced on both faces in such a manner as to increase resistance to both positive and negative flexing; and (c) maintain unchanged over time the aesthetic properties of the stone material from which they are formed. These aims are achieved by the process according to the present invention which is of the type in which the slab of stone material is reinforced in respect of its rear, or invisible, face according to the process forming the subject-matter of the above-identified United States patent application, characterized also in that a layer of reinforcing material comprising non-twisted glass threads embedded in a transparent hardenable resin resistant to the yellowing caused by atmospheric agents and especially by UV rays resulting from exposure to the sun's rays is applied to the front, or visible, face of the slab.

The expression "small thickness" means that the thickness is preferably not greater than 10 mm, although this is naturally not to be understood in a limiting sense.

BRIEF DESCRIPTION OF THE DRAWINGS

FIG. 1 is a sectional view of a slab of stone material according to the invention; and FIG. 2 is a partial planar and sectional view looking down onto a face of the slab of stone material.

DESCRIPTION OF THE PREFERRED EMBODIMENTS

In the preferred embodiment of the present invention, a layer of reinforcing material comprises a mat of non-twisted glass threads similar to that used for reinforcing the rear face except that the glass mat is used in an amount such that there are approximately from 100 to 800 g of mat per square meter of slab surface area, preferably 500 g of mat per square meter of slab surface area.

With regard to the transparent hardenable resin, the best results are obtained by using epoxy resins, preferably aliphatic epoxy resins, to which UV ray absorbers and UV ray scavengers are added. Alternatively, it is possible to use resins of the acrylic and/or polyurethane acrylate type. The percentage ratios by weight between the mat and the resin are of the same order as those used for reinforcing the rear face of the slab.

Practical tests carried out using the process of the present invention have shown that the flexural resistance of the slab, which is always from 10 to 12 mm thick, in respect of its front, or visible, face, increases from values of from 120 to 180 kg/cm$^2$, naturally depending on the stone material constituting the slab, to values of from 400 to 800 kg/cm$^2$.

After the resin-hardening stage, the visible surface of the resultant slab can be subjected to polishing and/or varnishing operations, while the mechanical smoothing and/or polishing of the slab surface underneath the reinforcing layer of mat and transparent resin is no longer necessary. In terms of industrial working, the advantages which are thus obtained are clear.

According to a variant which is especially useful when it is also desired to increase the resistance of the visible front face of the slab to scratching or abrasion, the resin is supplemented with a suitable anti-scratch agent and/or is charged with extremely fine glass or quartz powder in an amount such as not to compromise the transparency of the resin.

One of the major advantages of the process according to the present invention resides in the fact that, in the case of slabs of marble or other calcareous stones, the reinforcing layer obtained by the process of the present invention also provides lasting protection against yellowing and/or discoloration which is one of the disadvantages of using such material as an external covering.

In addition, because both marble and calcareous stone are sensitive to the action of acids, and thus also to the action of so called acid rain, the present invention substantially solves this specific problem and disadvantage also.

Likewise, in the case of porous stone materials, such as, for example, travertines, the external reinforcing layer, or the layer applied to the front face of the slabs, increases the slabs' resistance to breakage or damage resulting from the alternation of hot and cold seasons because the possibilities of water being absorbed in the open pores of the front face is drastically reduced. The appended Figures show, naturally in diagrammatic form, a slab reinforced on both faces.

Referring to the drawings and in particular to FIG. 1, the reference 10 indicates a slab of stone material having a thickness not greater than 10 mm although this must of course not constitute a limitation of the present invention, and having a front face, or visible face, 12 and a rear face 14.

The rear face 14 is reinforced by the process forming the subject-matter of the aforenoted co-pending United States patent application singled out above, by means of a mat 16 of glass threads 18 and a layer of epoxy resin 20.

As already mentioned above, the rear face 14 may have grooves or cavities which accommodate linear elements, for example glass fibre strands, which are also embedded in the epoxy resin in cases where a firmer and more substantial reinforcement of the rear face is required.

The front face 12 is provided with a reinforcing layer which comprises a plurality of non-twisted glass threads 22, preferably in the form of a mat 24, in an amount corresponding to approximately from 100 to 800, preferably approximately 500, grams of mat per square meter of slab surface area.

FIG. 2 shows a portion of the mat 24 in a form which is diagrammatic and exaggerated, since the mat 24, being composed of transparent glass threads distributed more thinly than the glass threads of the mat reinforcing the rear face, is in fact practically invisible.

The reference 26 indicates a protective and reinforcing resin layer which, by definition, must be transparent and hardenable and, in addition, must be resistant to the action of atmospheric agents, in particular the yellowing which UV rays often cause in plastics materials.

Epoxy resins, preferably aliphatic epoxy resins, supplemented with UV ray absorbers and/or so called UV ray scavengers, have been found to be especially advantageous.

Alternatively, it is possible to use acrylic resins, which definition is intended to cover both acrylic resins proper and methacrylic resins, and also copolymers of acrylic and methacrylic resins with other monomers, for example of the urethane type, provided of course the above-mentioned requirements are satisfied. When the mat and the resin have been applied, the resin is hardened, after which it is possible to proceed with the above-mentioned finishing works.

As already mentioned above, when it is desired to obtain a reinforcement which confers on the face 12 resistance to scratching and abrasion, the resin 26 may be charged with silica or quartz powder in an amount such as not to compromise the perfect transparency of the reinforcing layer. Alternatively and/or in addition to the resin, it is possible to add an anti-scratch agent known per se.

Furthermore, the reinforcing process according to the present invention also increases the resistance of the visible face of the slab to the action of aggressive chemical agents, such as, for example, acids.

The invention has been described in relation to preferred embodiments, it being understood that modifications and variations which are equivalent in terms of design and structure are possible and can be provided for without departing from the scope of the invention. For example, the rear, or invisible, face of the slab could be reinforced in a manner different from that provided for above, or it could be combined with other materials, such as in the case of composite slabs of glass and/or stone materials having fire-retardant and/or sound-absorbing properties It will be obvious to those skilled in the art that various changes and modifications may be made without departing from the scope of the invention.

What is claimed is:

1. A process for the production of a reinforced slab of stone material, said slab having an unexposed rear invisible reinforced face and exhibiting decorative properties to provide special esthetic effects and a reinforcement which includes a hardened resin and exposed front visible face having a visible surface area, the front visible face of the slab having a flexural resistance that is between 400 to 800 kg/sq.cm, and the reinforcement and resin not detracting from the special esthetic effects, comprising the steps of:

providing a layer of reinforcing material comprising a plurality of non-twisted glass threads embedded in a layer of transparent hardenable resin which is resistant to atmospheric agents, applying the layer of reinforcing material to the visible surface area of said exposed front face of said slab, wherein the amount of the applied non-twisted glass threads is approximately 100 to 800 grams per square meter of visible surface area of the exposed front face, hardening the said resin after applying the layer of reinforcing material to the visible surface area, so that the front visible face of the slab has the flexural resistance that is between 400 to 800 kg/sq.cm, and the reinforcement formed by the resin and the non-twisted linear glass reinforcing elements having a percentage ratio by weight of resin to the non-twisted linear reinforcing elements of at most 50:50, whereby to increase the strength from a range of 120 to 180 kg/cm$^2$ to 400,to 800 kg/cm$^2$.

2. The process according to claims 1, wherein the resin is of the hardening type including acylic or polyurethane acrylate resins and the layer coating the non-twisted glass threads is a transparent hardenable resin.

3. The process according to claim 11, for production of a reinforced slab of stone material having a high resistance to both positive and negative flexing and consisting of three layers, the slab forming one of the three layers, including the step of applying a second reinforcing layer to the rear, invisible face of the slab prior to applying the first-mentioned layer of reinforcing material to the front visible face of the slab, the second layer comprising a resin of the hardening type which is combined with the rear face of the slab, and the first layer coating the non-twisted glass threads is embedded with transparent hardenable resin, the percentage ratio by weight of resin to non-twisted glass threads in said first-mentioned layer being at most 50:50.

4. The process according to claim 1, wherein the non-twisted glass strands are in the form of a mat, and the amount of mat applied is approximately 500 grams per square meter of slab surface area.

5. The process according to claim 1, wherein the resin is an epoxy resin, an acrylic resin, a polyurethane acrylate resin or a methacrylic resin.

6. The process according to claim 1, wherein the resin is an aliphatic epoxy resin.

7. The process according to claim 1, wherein the transparent hardenable resin is also resistant to chemical agents and including the step of adding anti-scratch and anti-abrasion agents to the transparent hardenable resin.

8. The process according to claim 1, including the step of charging the transparent hardenable resin with a powder of material capable of increasing the resistance of the surface of the finished slab to abrasion or to scratching.

9. The process according to claim 8, wherein the powder of material is quartz or silica in extremely finely powdered form.

10. The process according to claim 1, wherein the resin is an epoxy resin supplemented with UV absorbers or UV ray scavengers.

11. The process according to claim 1, said reinforced slab comprising three layers wherein the resin is resistant to chemical agents.

12. A reinforced slab of stone material including a slab of stone material having a visible slab surface area forming a visible exposed front face and a layer of reinforcing material, comprising a reinforcing layer of non-twisted glass threads impregnated with a transparent hardenable resin resistant to atmospheric agents overlying said visible front face of the slab and, the amount of said reinforcing layer is such that there are approximately 100 to 800 g of non-twisted glass threads per square meter of visible surface area of slab exposed front face, and the visible front face of the slab reinforced with the layer of reinforcing material has a flexural resistance between 400 to 800 kg/cm$^2$, and said resin having a percentage ratio by weight of resin to said layer of reinforcing material of at most 50:50.

13. The reinforced slab according to claim 12, wherein the resin is resistant to chemical agents.

14. The reinforced slab of stone material according to claim 12, wherein the stone material is marble, travertine, granite or porphyry, and the non-twisted glass threads in said transparent hardenable resin are in form of a mat, and the visible front face of the slab reinforced with the mat has a flexural resistance of between 400 to 800 kg/cm$^2$.

15. The reinforced slab of stone material according to claim 12, wherein the resin is an epoxy resin, an acrylic or a methacrylic resin or copolymers of an acrylic and a methacrylic resin.

16. The reinforced slab of stone material according to claim 12, wherein the resin is an aliphatic epoxy resin.

17. The reinforced slab of stone material according to claim 12, said reinforced slab comprising three layers wherein the resin is resistant to chemical agents.

18. The reinforced slab of stone material according to claim 12, said reinforced slab comprising three layers wherein the slab includes a reinforced rear face reinforced with a resin of the hardenable type, said hardenable resin being combined with the rear face of the slab and non-twisted linear elements being coated with the resin, said resin having a percentage ratio by weight of resin to the linear reinforcing elements of at most 50:50.

19. The reinforced slab of stone according to claim 18, wherein the non-twisted linear elements comprise glass strands.

20. The reinforced slab of stone material according to claim 18, wherein the non-twisted linear elements comprise glass strands formed into a glass-strand matting, and the percentage weight of resin to glass-strand matting is 33:66, and the transparent hardenable resin is an acrylic resin, a methacrylic resin or a copolymer of acrylic and methacrylic resins with other monomers.

21. The reinforced slab of stone material according to claim 12, wherein the resin is an epoxy resin supplemented with UV ray absorbers or UV ray scavengers.

\* \* \* \* \*